United States Patent [19]

Cowley

[11] 4,453,881
[45] Jun. 12, 1984

[54] ROLLER ASSEMBLY

[76] Inventor: Keith Cowley, 4 Arthur Pl., Croydon, Victoria, Australia

[21] Appl. No.: 292,244

[22] Filed: Aug. 12, 1981

[30] Foreign Application Priority Data

Aug. 15, 1980 [AU] Australia .............................. PE5056

[51] Int. Cl.³ ................................................ B60F 3/10
[52] U.S. Cl. ..................................... 414/534; 414/533
[58] Field of Search .......................... 414/529, 532–535; 280/414.1; 193/37, 42

[56] References Cited

U.S. PATENT DOCUMENTS

| 3,021,969 | 2/1962 | Peake et al. ........................ 414/533 |
| 3,539,066 | 11/1970 | Stevenson . |
| 3,603,465 | 9/1971 | King . |
| 3,608,754 | 9/1971 | Park . |
| 3,680,676 | 8/1972 | Smith ............................. 414/533 X |
| 3,756,439 | 9/1973 | Johnson . |
| 3,785,677 | 1/1972 | Calkins . |
| 4,099,279 | 7/1978 | Park . |
| 4,278,388 | 7/1981 | Johnson . |

FOREIGN PATENT DOCUMENTS 912889 12/1962 United Kingdom .

Primary Examiner—Robert G. Sheridan
Attorney, Agent, or Firm—Birch, Stewart, Kolasch & Birch

[57] ABSTRACT

A roller assembly for a boat trailer is provided which does not call for careful alignment of the boat with respect to the trailer. The assembly is inclusive of a frame and, on the frame, a roller, a mounting member and a coupling member. The mounting and coupling members are such that a limited rocking movement of the assembly is permitted, this movement coming into play in response to an offset load bearing force.

11 Claims, 4 Drawing Figures 4,453,881

ROLLER ASSEMBLY

FIELD OF THE INVENTION

The present invention relates to a roller assembly for a boat trailer.

BACKGROUND OF THE INVENTION

Most small boats in private use today are taken to the water on specially designed boat trailers, from which they are launched and subsequently reloaded at sloping ramps or the like. To this end, boat trailers are equipped with a fixed roller assembly, and usually a winch and cable, to lift the boat from the water.

All boats have a sharp, forward V-section and usually a single centre keel which first contacts a central roller when reloading the boat. If the boat is out of line with the trailer, due to tide or wind, the keel may well roll off one end of the roller. The pull of the winch cable will tend to swing the boat to the centre, but this will only effectively come into play when the boat is some distance along the trailer. By that time of course, the boat may have been 'lost'. It therefore becomes important to line up the boat carefully, with respect to the roller and hence the trailer, before starting the winch, to ensure the boat does not run off the roller.

There are times, though, when conditions are such that accurate alignment is well nigh impossible: very choppy seas, for instance. Modifications have been made to the design of the roller proper with this in mind and with an eye on minimizing the possibility of 'losing' the boat. For example, the continuous surface of the roller, which is normally approximately concave, may be modified so as to be more steeply inclined to either side of the middle of the roller. This, however, can introduce another problem, namely jamming of the boat keel. Also, the ends of the roller can be altered to include stops designed to prevent the boat riding over the ends, but this arrangement adds substantially to the cost of the assembly as a whole and, besides, is not especially effective for the job at hand.

SUMMARY OF THE INVENTION

The object of the present invention is to provide a roller assembly which does not require that the boat be lined up carefully with respect to the trailer; where jamming is not a problem; and in which costs are not a substantial factor.

So long as any misalignment of the boat is within reasonable limits, say about fifteen to twenty degrees either side of 'normal', the boat will not run off the roller.

Accordingly, the invention provides a roller assembly including a roller, for mounting on a boat trailer, mounting being such that, in use of the assembly with the keel of a boat running along the roller, the roller assembly is able to reposition itself with respect to the boat keel so as to compensate for any tendancy that the boat might otherwise have to run off an end of the roller.

Of course, once the winch cable centres the front of the boat there is no longer any danger of 'losing' the boat, and there then follows an automatic centring of the boat keel on the roller and in alignment with the longitudinal trailer centre.

BRIEF DESCRIPTION OF THE DRAWINGS

Preferred embodiments of the invention will now be described by way of example only and with reference to the accompanying drawings in which.

DETAILED DESCRIPTION OF THE INVENTION

Figure 1:
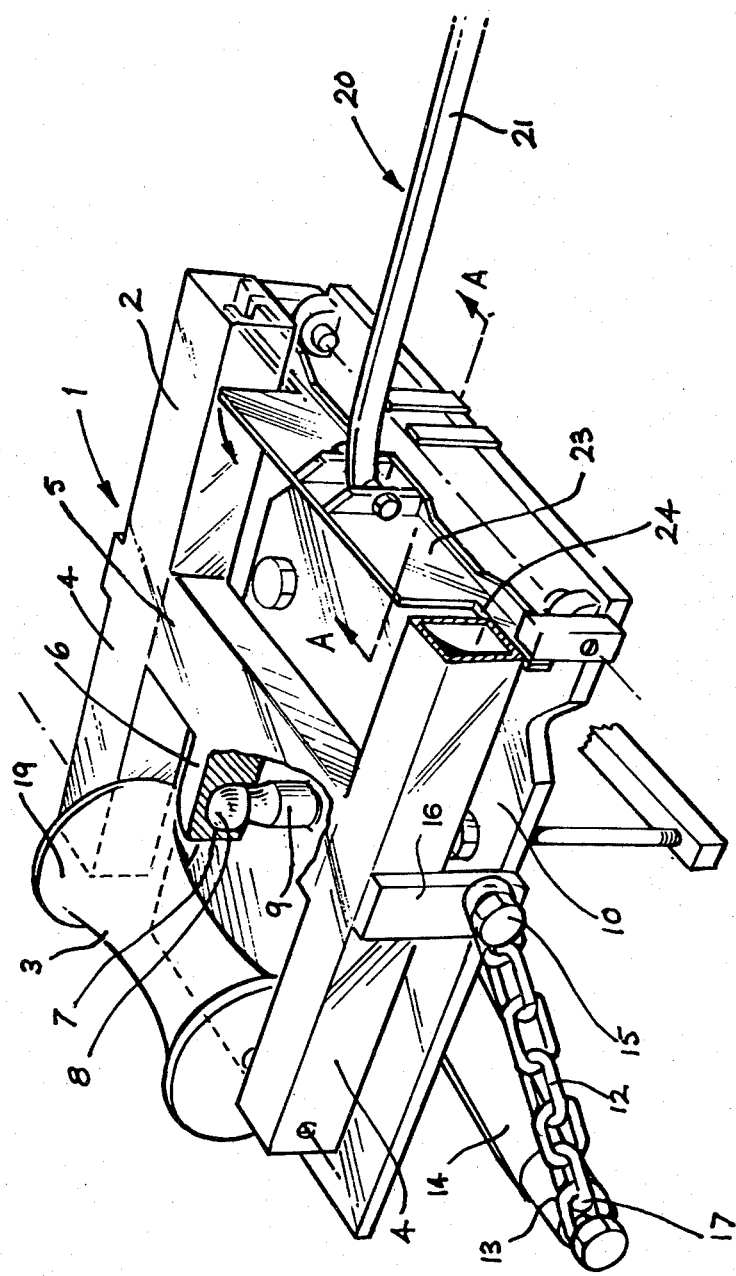
FIG. 1 is a perspective of one form of a roller assembly in accordance with the invention.
Figure 2:
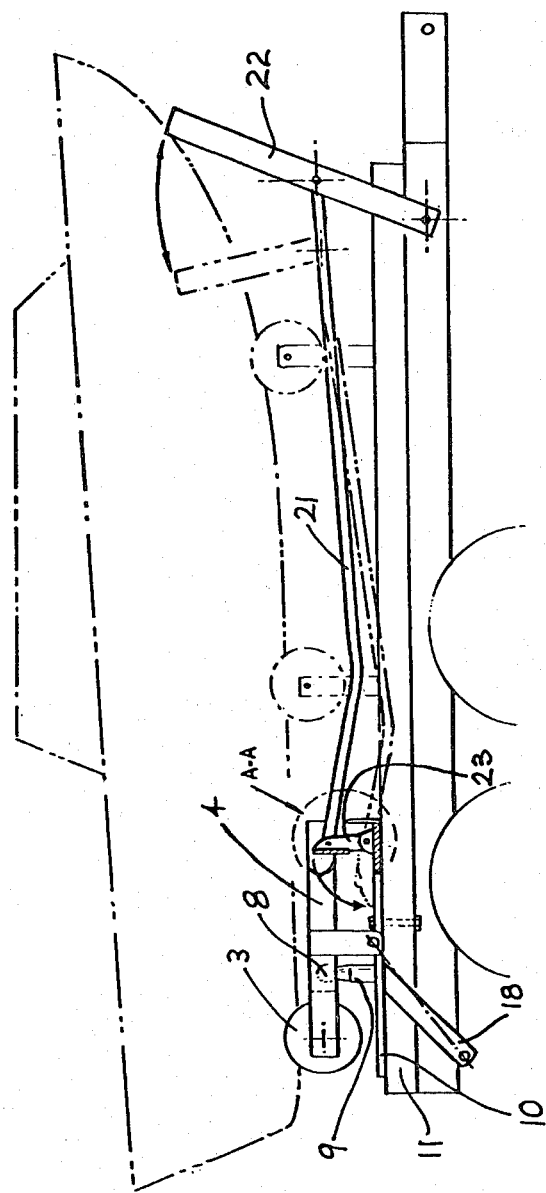
FIG. 2 is a side elevation of the assembly of FIG. 1, as mounted on a trailer towards the rear thereof.

In FIG. 1, the roller assembly—generally designated as 1—includes a frame 2 for carrying the roller 3. The frame 2 comprises a pair of parallel and forwardly (with respect to the roller 3 and the trailer on which the assembly is (to be) mounted) extending side rails 4 and a central cross-piece 5. The rails 4 are fitted with suitable bearings to accommodate the ends of the roller 3. The cross-piece 5 has a rearwardly extending mid-section 6 suitably socketed on its underside, at 7, to accommodate the ball 8 of an upstanding ball joint 9. The joint 9 thus serves to support the frame 2 and roller 3 above a rectangular plate 10 which is connected (see FIG. 2) to the trailer 11 and out of which extends the joint 9.

The ball and socket joint 7, 9 is such as to permit limited pitching, rolling and yawing movement of the frame 2 and roller 3 with respect to the plate 10 and hence trailer 11.

Movement in these various directions is in fact limited by means of a tension chain 12 coupled to each side of the frame 2 and to each end 13 of a crossbar 14 on the trailer 1. The forward end 15 of each chain 12 is fixed to a plate 16 depending downwardly from a respective side rail 4, whilst the rearward end 17 is fixed to the end 13. The cross-bar 4 is mounted on the trailer 11 via a pair of inclined posts 18 (shown only in FIG. 2).

The length of the chains 12 and their positioning relative to the frame 2 are so designed as to ensure the object of the invention is met. More specifically, any rolling movement of the frame 2 and hence the roller 3 should not be such that either of the end curved parts 19 of the roller assume a generally downward incline from the centre of the roller with respect to the horizontal, for if that were the case any boat keel would almost certainly slip off one end of the roller. Also, suffice it to say the spacing of the chains is greater than the width of the roller.

Figure 3:
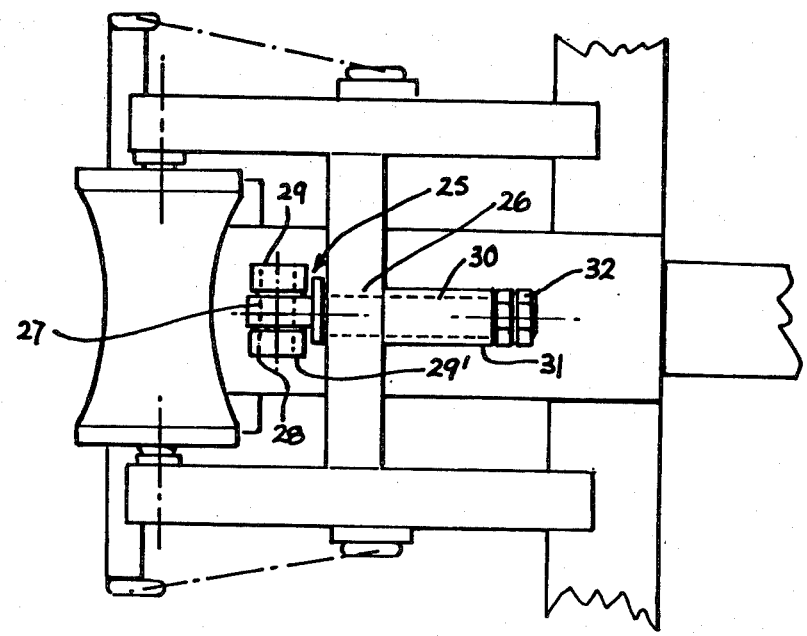
FIG. 3 is a plan view of a second form of a roller assembly in accordance with the invention.
Figure 4:
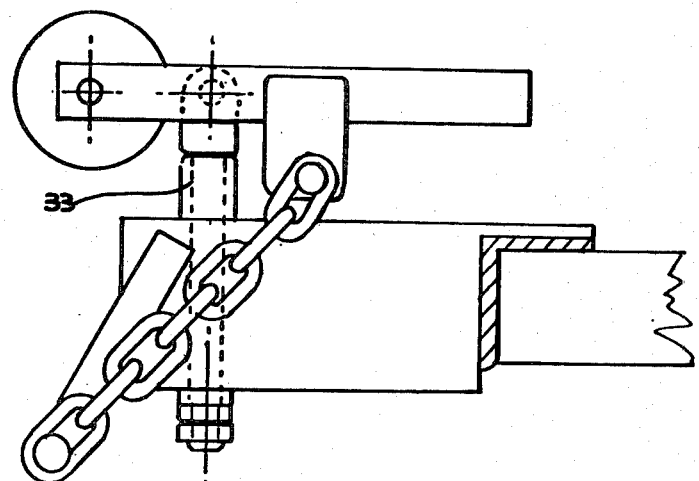
FIG. 4 is a side elevation of the assembly of FIG. 3.

Referring to FIGS. 3 and 4, the cross-piece in this embodiment is associated with a universal joint 25. The joint 25 consists of a longitudinal axle 26 the rear 27 of which is rotatably mounted on a transverse axle 28, and the ends of the axle 28 are in turn mounted in opposed journals 29, 29'. The forward position 30 of the axle 26 extends through the cross-piece and a hollow sleeve 31 welded or otherwise affixed to the cross-piece, and is held in position against inadvertent retraction as by a nut 32 screwed on to a threaded forward portion of the axle 26. The sleeve 31 is, however, able to partly rotate with respect to the axle 26, which means that the frame 2 and roller 3 can do likewise. The universal coupling, at 27, is mounted on a vertical post 33, so as to be rotatable about the axis of the post. Thus, there is again limited pitching, rolling and yawing movement of the frame and roller.

It will be understood from the aforementioned embodiment that the vertical axis 33 need not necessarily intersect the universal coupling, but it must intersect the axis of the longitudinal axle 26. Where all three axes intersect at the one point, a ball and socket joint may be utilised as illustrated in FIG. 1.

An explanation of the action of the roller assembly, by reference to the first embodiment, is this. A weight placed on the roller 3 will be balanced by the force of the tension chains 12 which are on opposite sides of the ball and socket joint pivot 7, 9. The force provided by these two chains 12, being exerted along a line at an angle to the vertical axis, may be resolved into two components, one acting vertically downwards and the other acting horizontal and tangentially to the line joining the upper chain attachments 15 to the ball joint 9.

When the load is placed at the centre of the roller 3, the two chains 12 will be equally loaded and, being equally inclined to the vertical, the vertical components of the chain tensions will share the load equally, and the horizontal components will be equal and opposite, thus balancing one another. The forces acting on the roller assembly 1 will be in static equilibrium with the assembly in the central position, that is, with the rails 4 in direct alignment with the length of the trailer.

If, on the other hand, the load on the roller 3 is placed to the right of the centre line of the roller assembly 1, a greater part of that load will be borne by the left-hand side chain 12. If the chains remained at the same angle to the vertical, the horizontal forces would be greater on the left than on the right, and would no longer be in equilibrium. The consequence is that the roller frame will assume a new position where the angle of the left side chain 12 will then be nearer to the vertical, thus increasing the vertical component of the chain tension and decreasing the horizontal component. The angle of the right hand chain 12 will be further from the vertical, thus decreasing the vertical component of chain tension and increasing the horizontal component. A new position will be reached in which the vertical components of the chain tensions added together will balance the load on the roller, while the horizontal components will again be equal and opposite and the forces on the roller frame will again be in equilibrium. The frame, however, will have turned horizontally anti-clockwise (viewed in plan) so that the load will be rolled towards the centre.

The above explanation assumes the load is progressing in a forward direction, as in the recovery of a boat from water and the loading on to the trailer.

In further regard to the illustrated first embodiment, a locking device 20 is provided to the fore of the assembly 1. In essence, the device 20 comprises a cranked push rod 21 operable by a handle 22 to raise and lower a locking plate 23. In the raised position (FIG. 1), plate shoulders 24 arrest movement of the rails 4. To launch a boat, the boat is taken off the trailer with the locking device 20 in the illustrated (that is, raised) position.

Although chains are used in the illustrated embodiment, it is to be understood that any form of tension link, if flexibly jointed at the ends, will serve the same purpose. Furthermore, in launching the boat from the trailer, arrangement could be made for positioning of the chains in the opposite direction.

What is claimed is:

1. A roller assembly for mounting on a boat trailer comprising:
    a frame;
    a roller mounted on the frame;
    universal mounting means on the frame for mounting the roller assembly on the trailer, for limited rocking and rotational movement; and
    coupling means on the frame for coupling the roller assembly to the trailer, said coupling means being such that said limited rocking and rotation movement is permitted;
    said coupling means including tension means which, in use of the assembly on a trailer, are responsive to load bearing forces on the assembly, whereby a repositioning of the assembly with respect to a boat keel is possible so as to compensate for any tendancy that the boat may have to run off one end of the roller.

2. A roller assembly according to claim 1, further comprising plate means including joint means on which said mounting means is mounted, said plate means being connectable to the trailer.

3. A roller assembly according to claim 2, wherein said joint means is a ball joint.

4. A roller assembly according to claim 1, wherein said mounting means is a socket.

5. A roller assembly according to claim 1, wherein the tension means comprises a tension link couplable to each side of the assembly and to each end of a cross member of the trailer.

6. A roller assembly according to claim 1, wherein a mounting point for the assembly is disposed forward, with respect to the trailer on which the assembly is to be mounted, of the roller but rearward of the forward end of the tension means.

7. A roller assembly according to claim 1, wherein the assembly comprises a generally H-shaped frame, with the roller bridging the uprights of the 'H' at one end thereof.

8. A roller assembly according to claim 7, wherein the underside of the cross-piece of the 'H' is socketed to accommodate a ball of a ball joint.

9. A roller assembly according to claim 7, wherein the cross-piece of the 'H' is T-shaped, with the upright of the 'T' extending towards the roller and the underside of the upright being socketed to accommodate a ball of a ball joint.

10. A roller assembly according to claim 1, wherein the assembly comprises a generally H-shaped frame, with the roller bridging the uprights of the 'H' at one end thereof, and wherein each tension link is coupled to an upright of the 'H' in close proximity to the junction of the upright and cross-piece of the 'H'.

11. A roller assembly according to claim 10, wherein the H-shaped frame comprises a pair of opposed side lugs extending normally to the plane of the 'H' and in substantial alignment with the cross-piece of the 'H', the free ends of the lugs engaging with the tension links.

* * * * *